(12) United States Patent
Liang et al.

(10) Patent No.: US 8,780,544 B2
(45) Date of Patent: Jul. 15, 2014

(54) FLAT CABLE ARRANGING STRUCTURE AND SLIDER ELECTRONIC APPARATUS THEREWITH

(75) Inventors: Chen-Yi Liang, New Taipei (TW); Chun-Chien Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 174 days.

(21) Appl. No.: 13/602,188

(22) Filed: Sep. 2, 2012

(65) Prior Publication Data

US 2013/0201625 A1 Aug. 8, 2013

(30) Foreign Application Priority Data

Feb. 6, 2012 (TW) .............................. 101103763 A

(51) Int. Cl.
*H05K 5/00* (2006.01)
*H05K 7/00* (2006.01)
*G06F 1/16* (2006.01)

(52) U.S. Cl.
USPC ............ 361/679.26; 361/679.27; 361/679.28; 361/679.29; 361/679.55

(58) Field of Classification Search
USPC ............. 361/679.26, 679.27, 679.28, 679.29, 361/679.55; 455/575.1, 575.3, 575.4; 345/156
See application file for complete search history.

(56) References Cited

U.S. PATENT DOCUMENTS

| 5,548,478 | A * | 8/1996 | Kumar et al. ............. 361/679.27 |
| 6,504,707 | B2 * | 1/2003 | Agata et al. ............. 361/679.05 |
| 7,273,089 | B2 * | 9/2007 | Hata et al. ................ 165/104.33 |
| 7,611,113 | B2 * | 11/2009 | Lai ............................. 248/286.1 |
| 8,081,435 | B2 * | 12/2011 | Ma et al. ................... 361/679.21 |
| 8,520,377 | B2 * | 8/2013 | Senatori .................... 361/679.27 |
| 8,654,520 | B2 * | 2/2014 | Lin et al. ................... 361/679.27 |
| 2003/0142474 | A1 * | 7/2003 | Karidis et al. ................. 361/683 |

* cited by examiner

*Primary Examiner* — Anthony Haughton
(74) *Attorney, Agent, or Firm* — Winston Hsu; Scott Margo

(57) ABSTRACT

A flat cable arranging structure and a slider electronic apparatus therewith are disclosed. The slider electronic apparatus includes two casings movably connected to each other, a flat cable connected to the two casings respectively, and a flat cable arranging structure. The flat cable arranging structure is disposed in one of the two casings and includes a movement-guiding structure, a pushing-against part, and a forcing mechanism. The movement-guiding structure is fixedly disposed. The pushing-against part is disposed to be connected to the movement-guiding structure and is capable of being confined by the movement-guiding structure to move in a specific direction. The flat cable partially winds the pushing-against part. The forcing mechanism is disposed to at least contact the pushing-against part to keep the flat cable in a tensile stretch state. Thereby, the flat cable can be stretched all the time so as not to intertwine together.

22 Claims, 11 Drawing Sheets

FLAT CABLE ARRANGING STRUCTURE AND SLIDER ELECTRONIC APPARATUS THEREWITH

BACKGROUND OF THE INVENTION

1. Field of the Invention

The invention relates to a flat cable arranging structure and a slider electronic apparatus, and especially relates to a flat cable arranging structure capable of dynamically arranging and a slider electronic apparatus having the flat cable arranging structure.

2. Description of the Prior Art

A conventional notebook is designed of flipping cover. The top cover (i.e. screen) is pivotally connected to the bottom base (i.e. keyboard) by a hinge. When the notebook is in use, the top cover and the bottom base are opened for providing a comfortable operation environment to a user. If the notebook is required to be stored, the top cover and the bottom base are closed so as to reduce required storage space. As the technology of touch control develops and products of touch control are popular, a common tablet computer is not provided with a fixedly-connected keyboard any more, so as to reduce the device volume and the required operation space. For a scenario of browsing common webs or seeing movies, the tablet computer is easy to operate. But for an operation scenario of long-term input, manipulating input directly on the touch screen leads to reduction of displaying area for images and tiredness of the user. Therefore, slider tablet computers are available on the market. For a scenario of browsing common webs, the touch screen and the keyboard of the slider tablet computer overlap, so the user operates the touch screen directly. For another scenario of manipulating input for a long time, the screen can be slid to be slantwise supported on the keyboard, which provides the user an operation environment like notebook. The screen and the keyboard are connected by a physical cable such as a flat cable. The relative movement of the screen to the keyboard is not only rotation but also sliding, so the distance between the connection ports on the screen and the keyboard respectively for the flat cable varies with different operation scenarios. In practice, the slide tablet computer is required to be provided with stretch space for the flat cable. Present arranging structures thereof are usually stationary. For smaller slider electronic apparatuses such as slide smart phones, the stretch mechanism of the flat cable of the smaller slider electronic apparatus can be realized in a single bend structure by the structural stability of the flat cable itself. However, if the length of the flat cable used in the slider tablet computer is relatively long, the structural stability of the flat cable may be insufficient after bent many times in a long time. Other components inside the tablet computer may also hook the flat cable. Letting the cable stretch free may make the flat cable intertwined together leading to the damage on the flat cable during the sliding process of the screen.

SUMMARY OF THE INVENTION

An objective of the invention is to provide a flat cable arranging structure, which uses a cable dynamically-arranging design so that an arranged flat cable can always keep in a stretch state without any intertwining so as not to be damaged.

The flat cable arranging structure of the invention is disposed in a slider electronic apparatus. The slider electronic apparatus includes a first casing, a second casing, and a flat cable. The first casing and the second casing are movably connected to each other. The first casing has an opening. The flat cable passes through the opening and is connected to the first casing and the second casing respectively. The flat cable arranging structure includes a movement-guiding structure, a pushing-against part, and a forcing mechanism. The movement-guiding structure is disposed in the first casing. The pushing-against part is connected to the movement-guiding structure and is capable of being confined by the movement-guiding structure to slide in a specific direction. A portion of the flat cable winds the pushing-against part. The forcing mechanism is disposed in the first casing and at least contacts the pushing-against part to keep the flat cable in a tensile stretch state. Thereby, the flat cable can be always kept in the stretch state without any intertwining so as not to be damaged.

Another objective of the invention is to provide a slider electronic apparatus having the flat cable arranging structure of the invention. Therefore, a flat cable in the slider electronic apparatus can be always kept in a stretch state without any intertwining so as not to be damaged.

The slider electronic apparatus of the invention includes a first casing, a second casing, a flat cable, and a flat cable arranging structure. The first casing has an opening. The first casing and the second casing are movably connected to each other. The flat cable passes through the opening and is connected to the first casing and the second casing respectively. The flat cable arranging structure includes a movement-guiding structure, a pushing-against part, and a forcing mechanism. The movement-guiding structure is disposed in the first casing. The pushing-against part is connected to the movement-guiding structure and is capable of being confined by the movement-guiding structure to slide in a specific direction. A portion of the flat cable winds the pushing-against part. The forcing mechanism is disposed in the first casing and at least contacts the pushing-against part to keep the flat cable in a tensile stretch state. Similarly, the flat cable can be always kept in the stretch state without any intertwining so as not to be damaged.

In sum, the invention uses the flat cable arranging structure of the cable dynamically-arranging design, so that the flat cable can be always kept in the stretch state, which solves the problem in the prior art that the stretch mechanism for the flat cable in the common slider tablet computer by use of the structural stability of the flat cable may easily induce the intertwining of the flat cable leading to damage after long-term use.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 5, 6, and 7 are schematic diagrams illustration the action of the movement mechanism of a pushing-against part of the flat cable arranging structure in FIG. 5.

DETAILED DESCRIPTION

Figure 1:
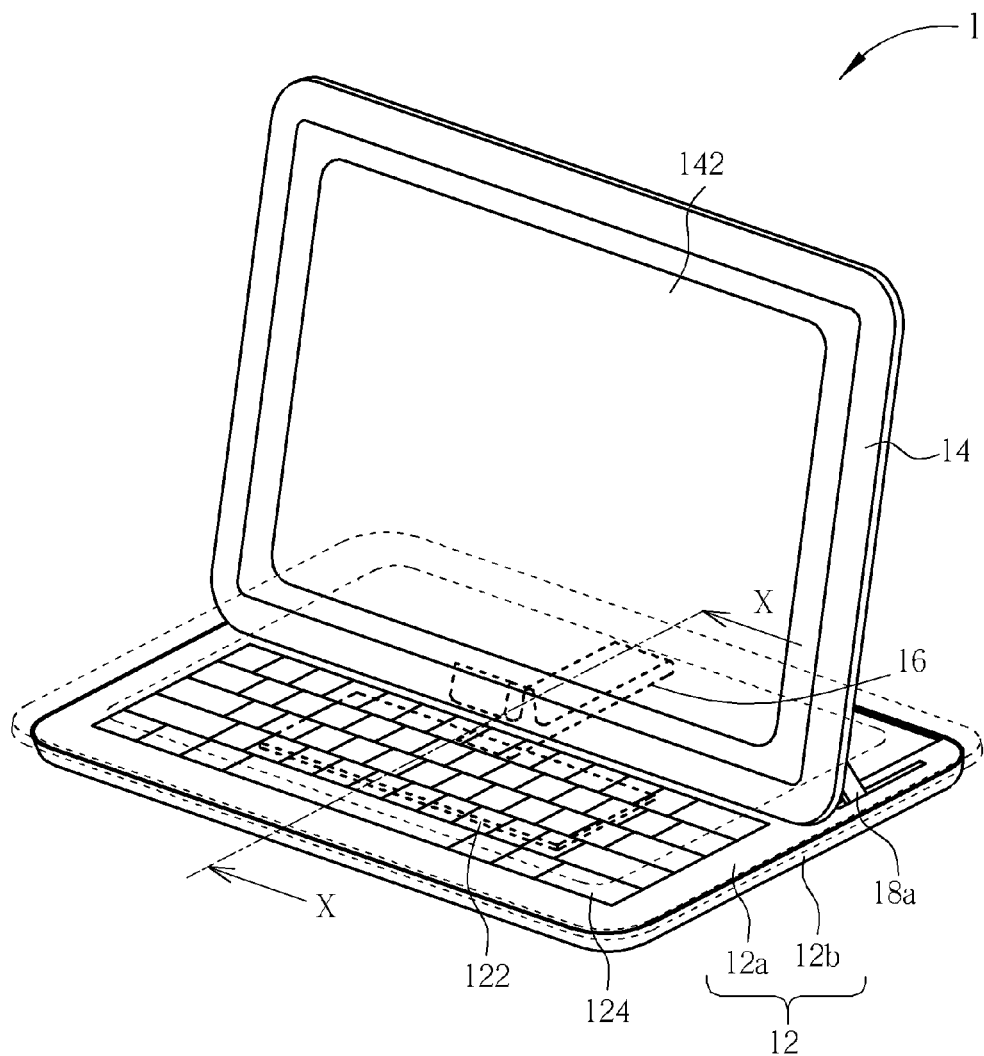
FIG. 1 is a schematic diagram illustrating a slider electronic apparatus of a preferred embodiment according to the invention.
Figure 2:
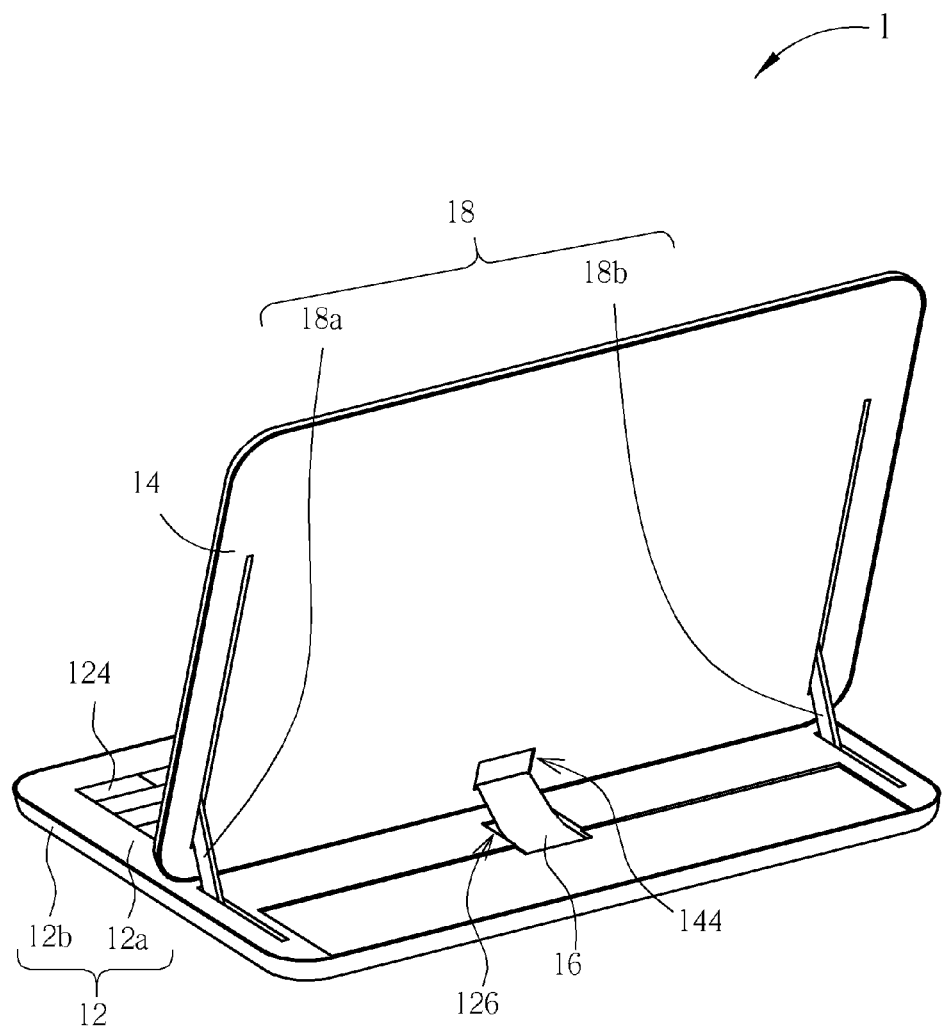
FIG. 2 is a schematic diagram illustrating the slider electronic apparatus in FIG. 1 in another view.

Please refer to FIG. 1 and FIG. 2. FIG. 1 is a schematic diagram illustrating a slider electronic apparatus 1 of a preferred embodiment according to the invention. FIG. 2 is a schematic diagram illustrating the slider electronic apparatus 1 in another view. In the embodiment, the slider electronic apparatus 1 includes a first casing 12, a second casing 14, a flat cable 16 (shown by dashed lines in FIG. 1), and a pivotal connection mechanism 18. The first casing 12 therein disposes a processing module 122 (shown by a dashed rectangle in FIG. 1) such as a system main board module electrically connected to a keyboard 124 on the first casing 12. The second casing 14 therein disposes a display module 142 such as a touch LCD panel, of which a screen is exposed from a window of the second casing 14. The flat cable 16 passes through an opening 126 of the first casing 12 and an opening 144 of the second casing 14 respectively to be electrically connected to the processing module 122 and the display module 142. In practice, the flat cable 16 can be a common flat cable, a flexible flat cable (FFC), a flexible printed circuit (FPC), or other flexible, flat cable. The pivotal connection mechanism 18 includes two hinges 18*a* and 18*b* disposed at two sides respectively of the first casing 12 and the second casing 14. The first casing 12 and the second casing 14 are connected by the hinges 18*a* and 18*b*. The first casing 12 can be slid and rotated relative to the second casing 14 by the hinges 18*a* and 18*b*. In practice, the pivotal connection mechanism 18 can further includes a support pivotally connected to the first casing 12 and the second casing 14 for together with the hinges 18*a* and 18*b* supporting the first casing 12 on the second casing 14 and for reducing the required strength of the hinges 18*a* and 18*b*.

Figure 3:
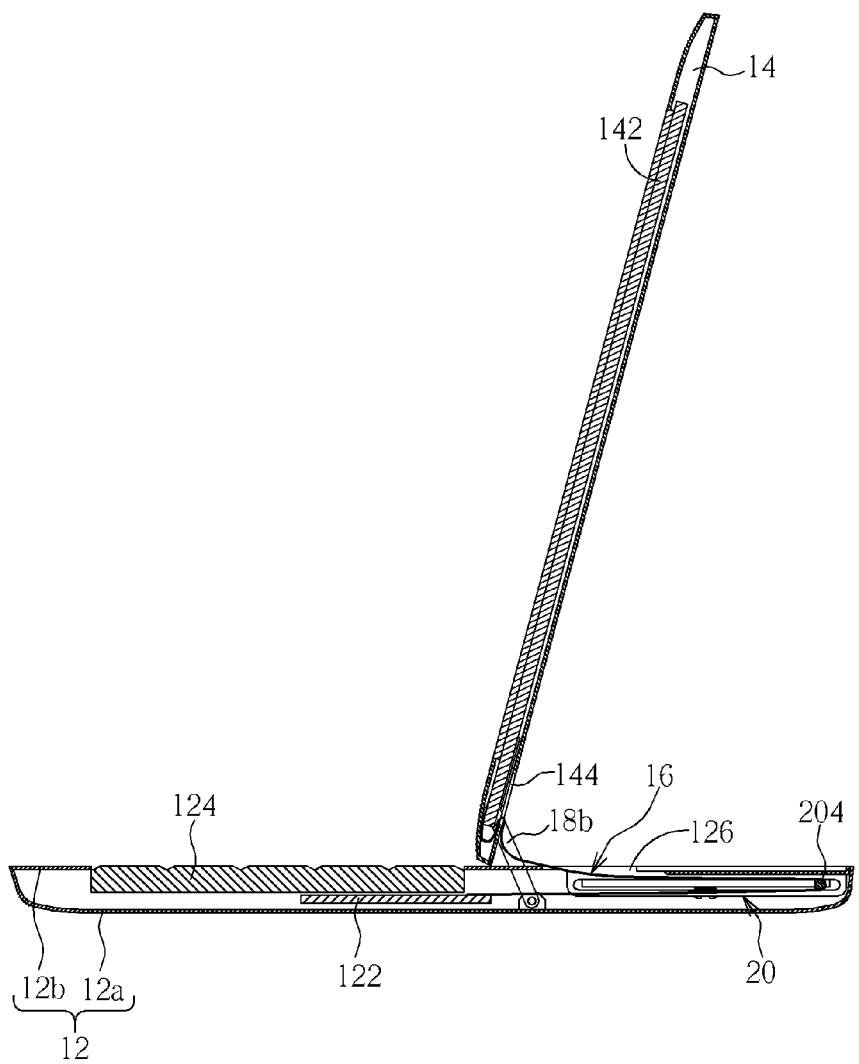
FIG. 3 is a sectional side view of the slider electronic apparatus in FIG. 1.
Figure 4:
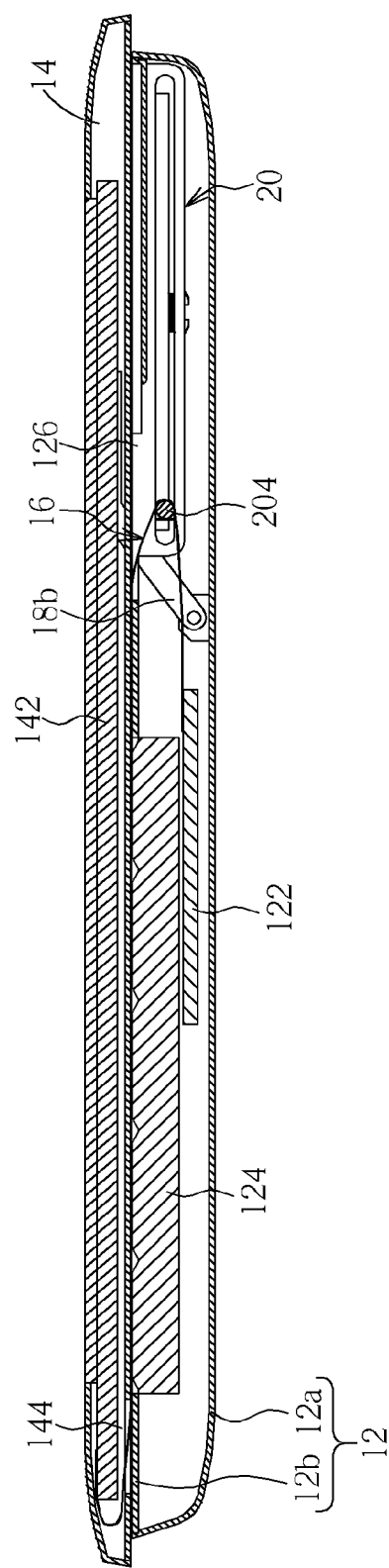
FIG. 4 is a sectional side view of the slider electronic apparatus in FIG. 1 when a first casing and a second casing thereof overlaps.

In FIG. 1, the slider electronic apparatus 1 can provide an operation environment of physical keyboard to user. When a user need to use the touch panel, the first casing 12 can overlap the second casing 14 by the pivotal connection mechanism 18, as shown by dashed lines in FIG. 1. In this case, the slider electronic apparatus 1 functions as a common tablet computer to provide a convenient operation environment to the user. Please refer to FIG. 3 and FIG. 4. FIG. 3 is a sectional side view of the slider electronic apparatus 1. FIG. 4 is a sectional side view of the first casing 12 and the second casing 14 when overlapping; the cutting position thereof is shown by the line X-X in FIG. 1. The opening 126 approaches the opening 144 when the first casing 12 is supported in a tilted position, so a large portion of the flat cable 16 is accommodated in the first casing 12, as shown in FIG. 3. When the first casing 12 and the second casing 14 overlaps, the opening 126 leaves the opening 144, an exposed portion of the flat cable 16 out of the first casing 12 increases relatively; that is, the portion of the flat cable 16 accommodated in the first casing 12 decreases, as shown in FIG. 4. Therefore, the disposition of the flat cable 16 varies as the slider electronic apparatus 1 changes between the two operation environments. In the embodiment, the slider electronic apparatus 1 includes a flat cable arranging structure 20 disposed in the first casing 12 for providing cable dynamically-arranging mechanism to the flat cable 16, so that the flat cable 16 can be always kept in a stretch state so as to avoid the flat cable 16 being intertwined together as the slider electronic apparatus 1 changes between the two operation environments.

Figure 5:
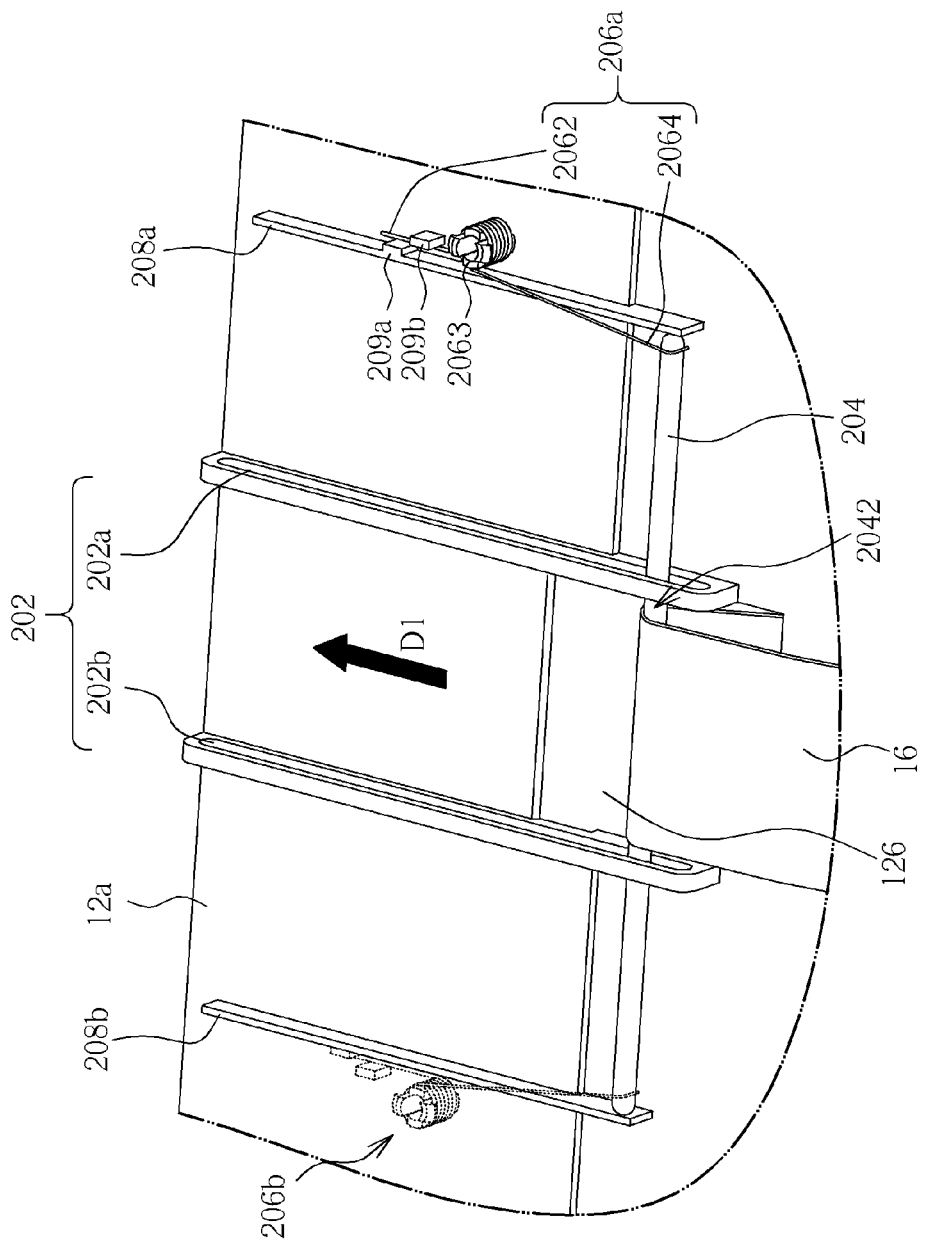
FIG. 5 is a schematic diagram illustrating a flat cable arranging structure of the slider electronic apparatus in FIG. 1.

Please refer to FIG. 5, which is a schematic diagram illustrating the flat cable arranging structure 20. In the embodiment, it is known in FIGS. 1 through 4 that the first casing 12 includes a top cover 12*a* and a bottom cover 12*b* engaged with the top cover 12*a*, and the flat cable arranging structure 20 is disposed on the bottom side of the top cover 12*a*. The view for FIG. 5 is from the bottom of the first casing 12 upward to the top cover 12*a*. The flat cable arranging structure 20 includes a movement-guiding structure 202, a pushing-against part 204, a forcing mechanism, and two constraint sidewalls 208*a* and 208*b*. The movement-guiding structure 202 includes two guiding slots 202*a* and 202*b* fixedly disposed in parallel on the top cover 12*a*, for example integrated with the top cover 12*a* in one piece. The pushing-against part 204 is a rod passing through the guiding slots 202*a* and 202*b* and capable of being structurally constrained by the guiding slots 202*a* and 202*b* to slide in a direction D1 in a position perpendicular or almost perpendicular to the guiding slots 202*a* and 202*b*. The constraint sidewalls 208*a* and 208*b* are fixedly disposed parallel to the guiding slots 202*a* and 202*b* on the top cover 12*a*, for example integrated with the top cover 12*a* in one piece. The constraint sidewalls 208*a* and 208*b* constrain two ends of the pushing-against part 204 so as not to make that the pushing-against part 204 excessively slanted in moving. The forcing mechanism includes a torsion spring 206*a* having a fixed end 2062 and a free end 2064. The main portion of the torsion spring 206*a* is sleeved on a fixing post 2063 of the top cover 12*a* for stable torsion of the torsion spring 206*a*. The fixed end 2062 is fixed on the top cover 12*a* by constraint blocks 209*a* and 209*b*. The free end 2064 hooks and pushes the pushing-against part 204 so as to maintain the tendency of the pushing-against part 204 to move backward (i.e. in the direction D1). In practice, the forcing mechanism 206 can include another torsion spring 206*b* (shown by dashed lines in FIG. 5) disposed on another side of the top cover 12*a* opposite to the torsion spring 206*a*, so that the torsion springs 206*a* and 206*b* jointly provide symmetric force on the pushing-against part 204, conducive to the moving stability of the pushing-against part 204. The flat cable 16 winds the pushing-against part 204 and extends out of the first casing 12 from the opening 126.

Figure 6:
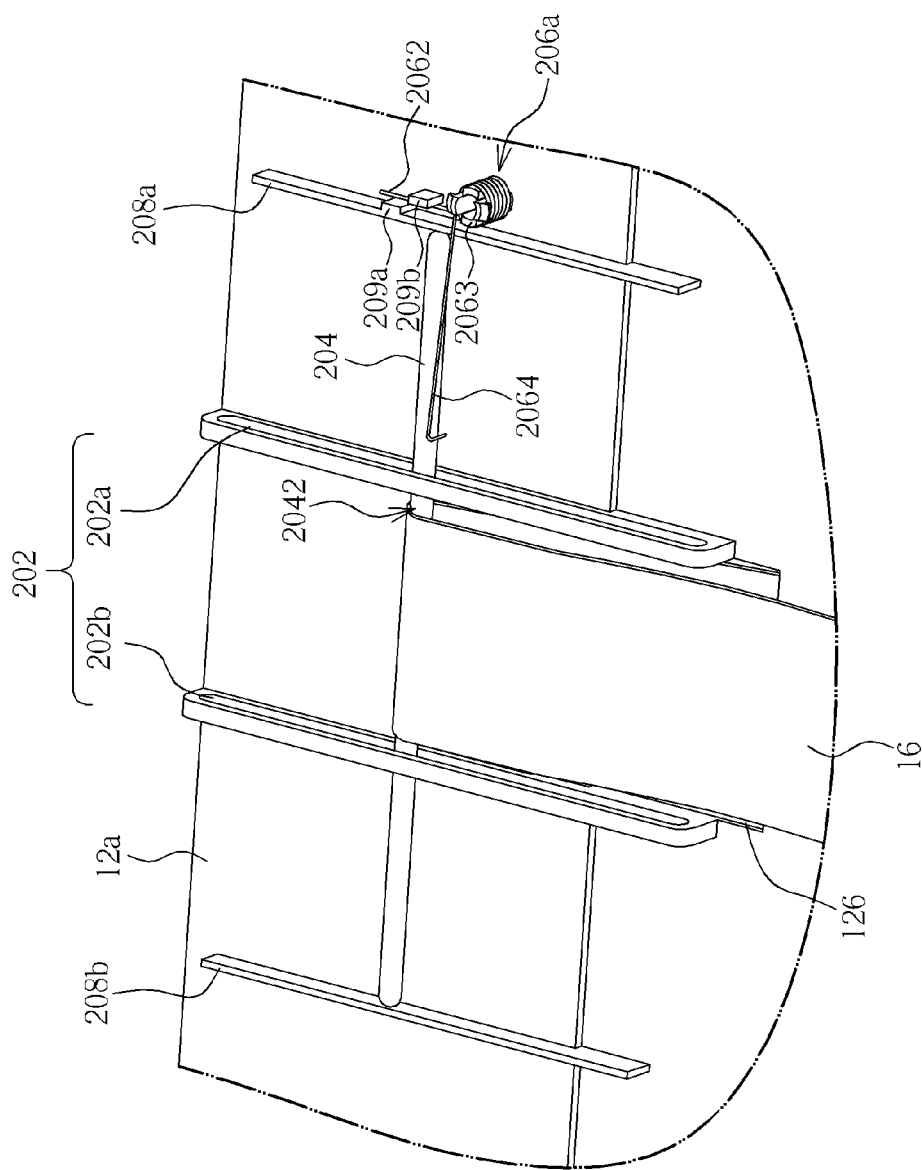
Figure 7:
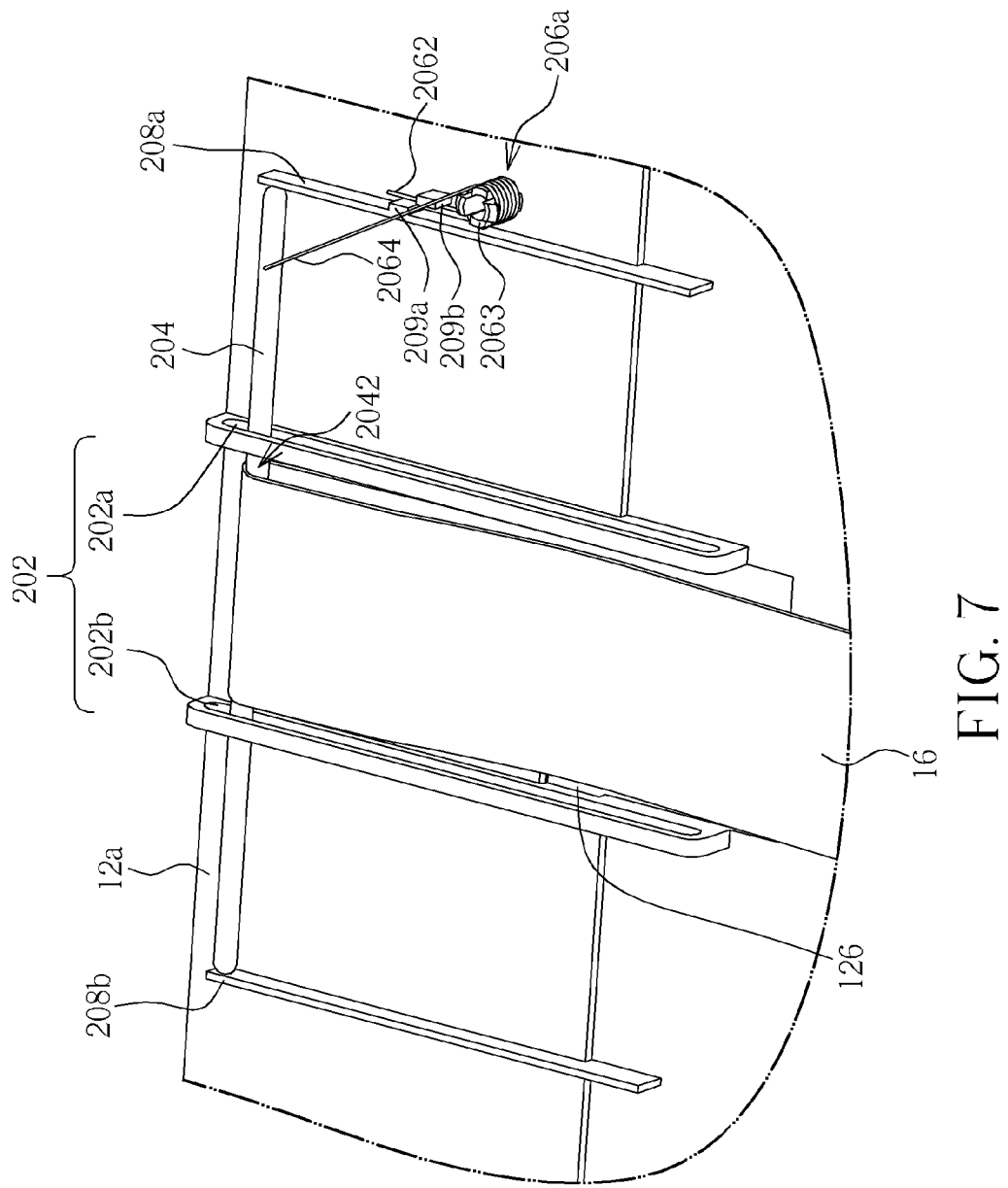

Please refer FIGS. 3 through 7. FIGS. 5 through 7 are schematic diagrams illustration the action of the movement mechanism of the pushing-against part 204. The forcing mechanism 206 is connected to the pushing-against part 204 for applying force to the pushing-against part 204 so that the pushing-against part 204 is kept in pushing the flat cable 16, so the distance between the opening 126 of the first casing 12 and the opening 144 of the second casing 14 is shortened gradually when the slider electronic apparatus 1 changes from the tablet operation mode in FIG. 4 to the keyboard input mode in FIG. 3. Though the flat cable 16 has a tendency to be loose gradually as the pull force by the second casing 14 decreases, the pushing-against part 204 can be kept in pushing the flat cable 16 backward by the torsion effect of the torsion spring 206*a*, so as to keep the flat cable 16 in the stretch state without the intertwining problem that a large portion of the flat cable 16 is crowded into the first casing 12 due to the loosing of the flat cable 16, as shown in order in FIGS. 5 through 7. Similarly, the distance between the opening 126 of the first casing 12 and the opening 144 of the second casing 14, reverse to the above mode change, is lengthened gradually when the slider electronic apparatus 1 changes from the keyboard input mode in FIG. 3 to the tablet operation mode in FIG. 4. Though the flat cable 16 is therefore pulled out of the first casing 12, the flat cable 16 still can be kept in being stretched in the tensile stretch state without intertwining of the flat cable 16 during the pulling, as shown in reverse order in FIGS. 5 through 7. It is added that for smooth stretch of the flat cable 16 by the pushing-against part 204, the pushing-against part 204 has a curved surface 2042 and pushes the flat cable 16 by the curved surface 2042 so as to avoid excessively rubbing or scraping on the flat cable 16.

Figure 8:
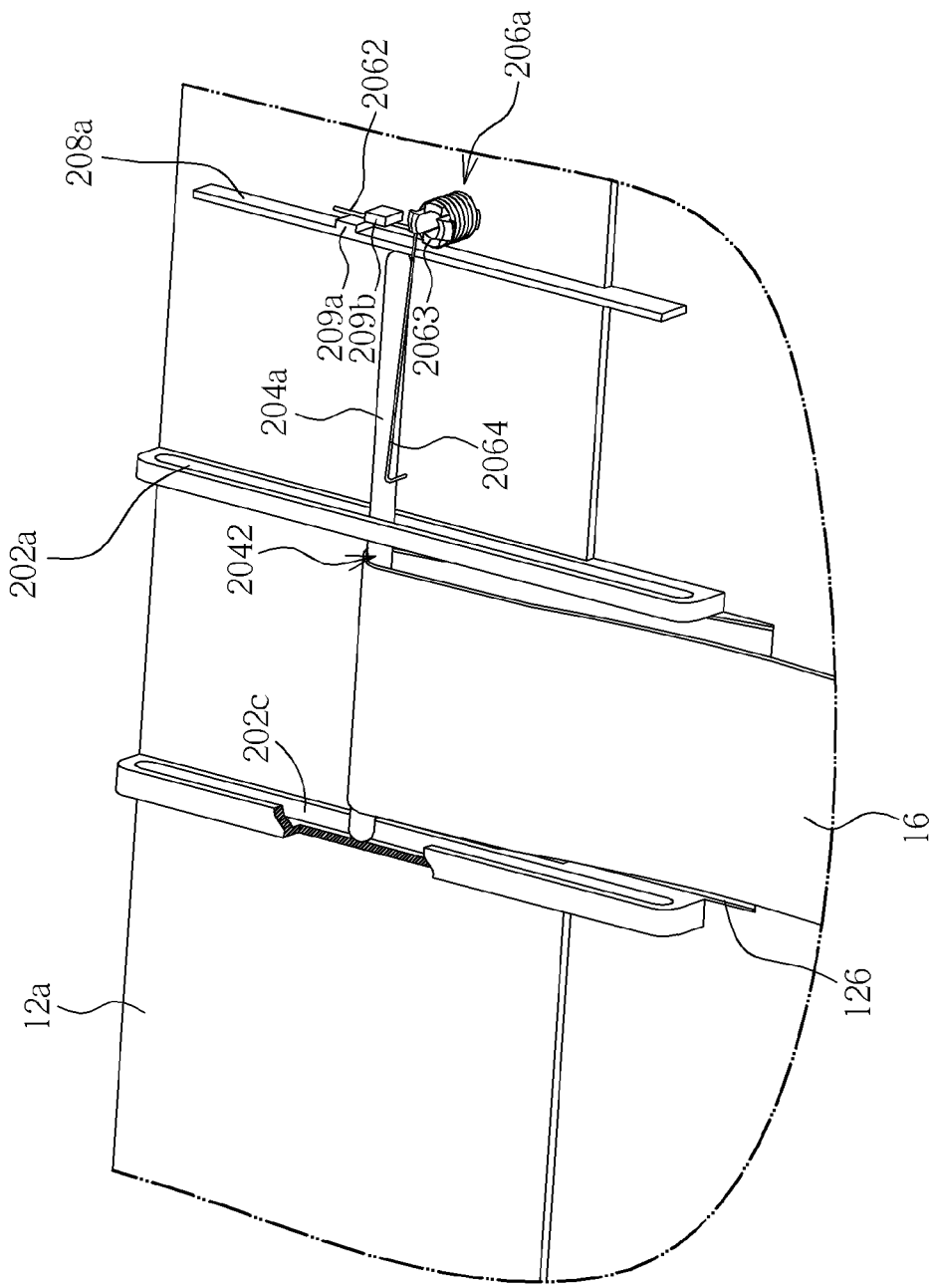
FIG. 8 is a schematic diagram illustrating a flat cable arranging structure of a slider electronic apparatus according to another embodiment.
Figure 9:
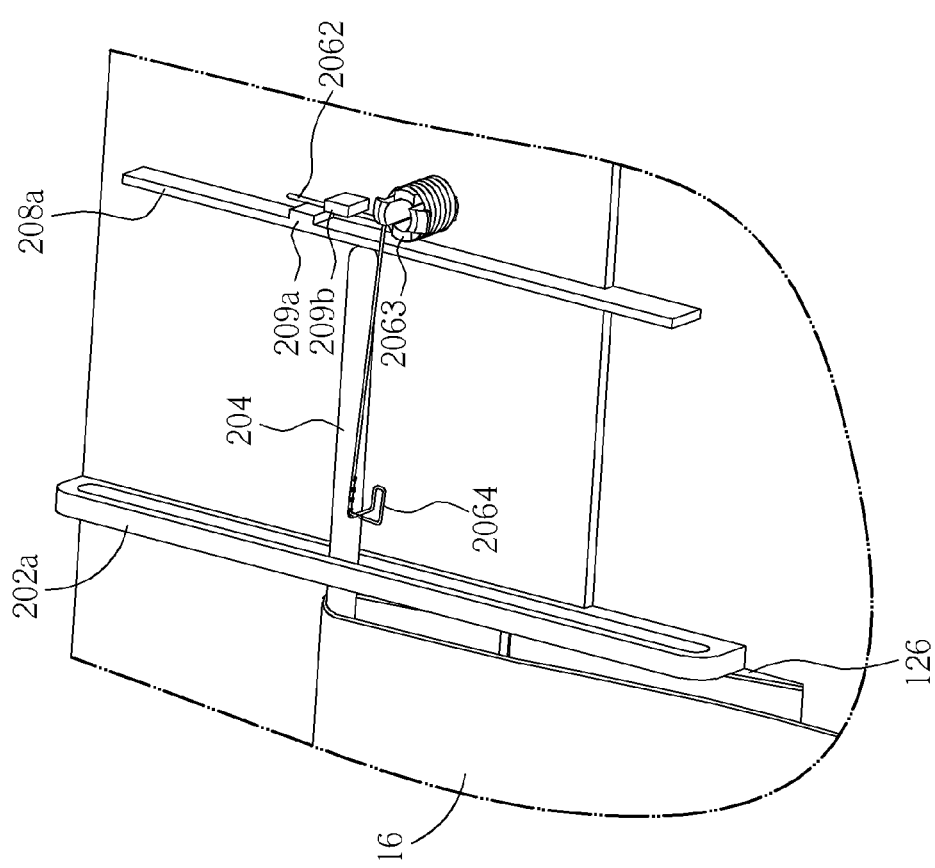
FIG. 9 is a schematic diagram illustrating a flat cable arranging structure of a slider electronic apparatus according to another embodiment.

It is added that in the embodiment, the guiding slots 202a and 202b are disposed at two sides of the opening 126, conducive to constraint of positioning the flat cable 16 in the first casing 12 during the movement of the flat cable 16. Furthermore, the constraint sidewall 208b can be integrated with the guiding slot 202b in structure, as shown in FIG. 8, e.g. a guiding slot 202c without through slot, by which the pushing-against part 204a can still be constrained so as not to be excessively slanted in moving. If the constraint sidewall 208a and the guiding slot 202a are required to be formed by structural integration, the guiding slot 202a in FIG. 5 can be moved to and integrated with the constraint sidewall 208a in structure. In this case, the free end 2064 of the torsion spring 206a is located between the integrated guiding slots and pushes the pushing-against part, or the pushing-against part can be design to have a thin rod, passing through the integrated guiding slot by a groove formed on the constraint sidewall of the integrated guiding slot, for the free end 2064 of the torsion spring 206a to push. In addition, in order that the free end 2064 of the torsion spring 206a can pushes the pushing-against part 204 effectively without departing of the torsion spring 206a form the pushing-against part 204 after acting many times, in practice, as shown in FIG. 9, the torsion spring 206a forms a bracket 2064a at the free end 2064. The hidden portion of the bracket 2064a is shown by dashed lines. A portion of the bracket 2064a is confined between the pushing-against part 204 and the top cover 12a, so during the movement of the free end 2064, the bracket 2064a can be kept in pushing the pushing-against part 204 without departing from the pushing-against part 204.

Figure 10:
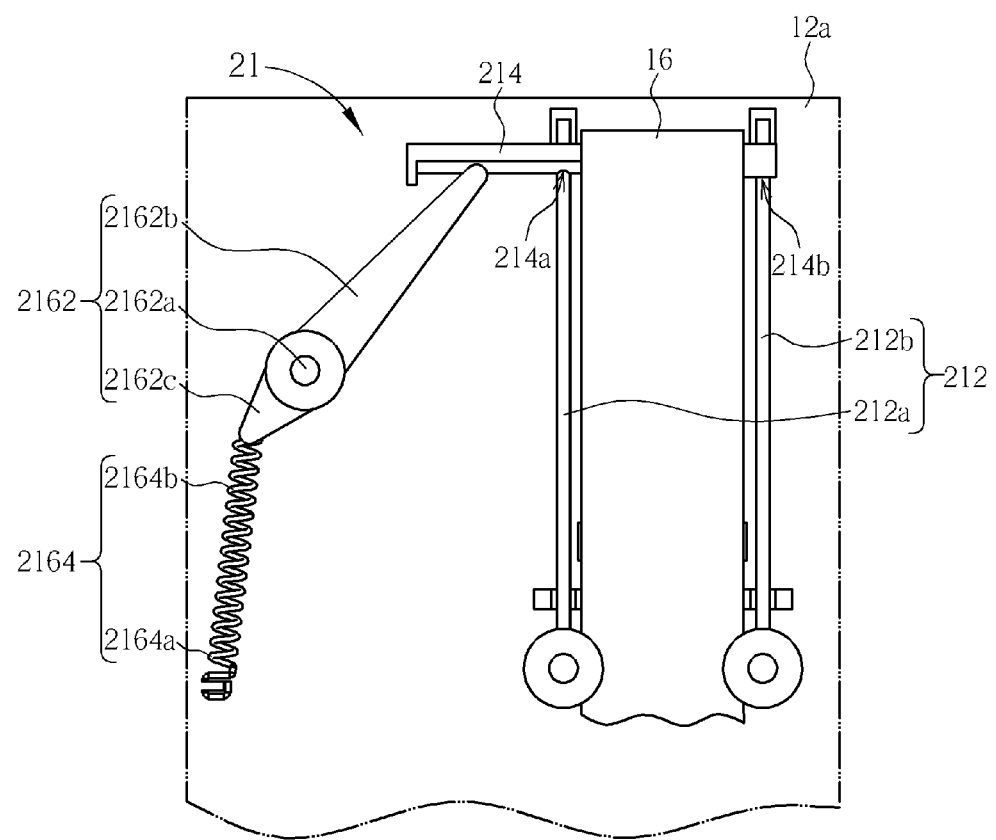
FIG. 10 is a schematic diagram illustrating a slider electronic apparatus according to another preferred embodiment.

In the above embodiment, the movement-guiding structure 202 constrains the movement of the pushing-against part 204 by the guiding slots 202a and 202b, but the invention is not limited thereto. Please refer to FIG. 10, which is a schematic diagram illustrating a flat cable arranging structure 21 of a slider electronic apparatus according to another preferred embodiment. This slider electronic apparatus is substantially similar in structure to the slider electronic apparatus 1. The main difference is that a movement-guiding structure 212 of the flat cable arranging structure 21 uses guiding slides to constrain the movement of a pushing-against part 214. In the embodiment, the movement-guiding structure 212 includes two guiding slides 212a and 212b fixedly disposed in parallel on the top cover 12a. The pushing-against part 214 has two through holes 214a and 214b, of which the profile matches with the profile of the guiding slides 212a and 212b. The pushing-against part 214 is movably disposed on the guiding slides 212a and 212b by the through holes 214a and 214b. Because the guiding slides 212a and 212b pass through the pushing-against part 214, the flat cable arranging structure 21 can maintain the level of the pushing-against part 214 when moving without constraint such as the constraint sidewalls 208a and 208b of the flat cable arranging structure 20. The forcing mechanism of the flat cable arranging structure 21 includes a transmission lever 2162 and a spring 2164. The transmission lever 2162 has a pivot 2162a, a long arm portion 2162b, and a short arm portion 2162c. An end 2164a of the spring 2164 is fixedly disposed on the top cover 12a; the other end 2164b of the spring 2164 is connected to the short arm portion 2162c. The transmission lever 2162 is capable of rotating about the pivot 2162a, so that the long arm portion 2162b pushes the pushing-against part 214. By the force transmission effect of the transmission lever 2162, the spring 2164 can apply force to the pushing-against part 214 by the transmission lever 2162 so as to keep the pushing-against part 214 in pushing the flat cable 16. Furthermore, by use of displacement magnifying effect of the transmission lever 2162, a small elastic deformation of the spring 2164 can induce a large displacement of the long arm portion 2162b, for providing an enough stroke to the pushing-against part 214.

In the above embodiment, the pushing-against part 214 extends only at the guiding slide 212a for the long arm portion 2162b to push. In practice, the pushing-against part 214 can extend also at the guiding slide 212b. Then, the slider electronic apparatus can includes two forcing mechanisms symmetrically disposed relative to the movement-guiding structure 212 for providing symmetrical force on the pushing-against part 214. Furthermore, if the guiding slides 212a and 212b are modified to be rectangular rods, it is sufficient to keep the pushing-against part 214 in levelly moving by one of the guiding slides 212a and 212b. Besides, the form of the guiding slide of the invention is not limited to the above-mentioned bar structure. A common slide structure is also applicable. In addition, in the above embodiments, the pushing-against parts 204 and 214 are illustrated by rods, but the invention is not limited thereto. In practice, the pushing-against part can be realized by a plate part. In principle, it is acceptable for the pushing-against part to have a structure capable of pushing the flat cable 16; for example, the pushing-against part thereon forms a long slot for the flat cable 16 to pass through.

Figure 11:
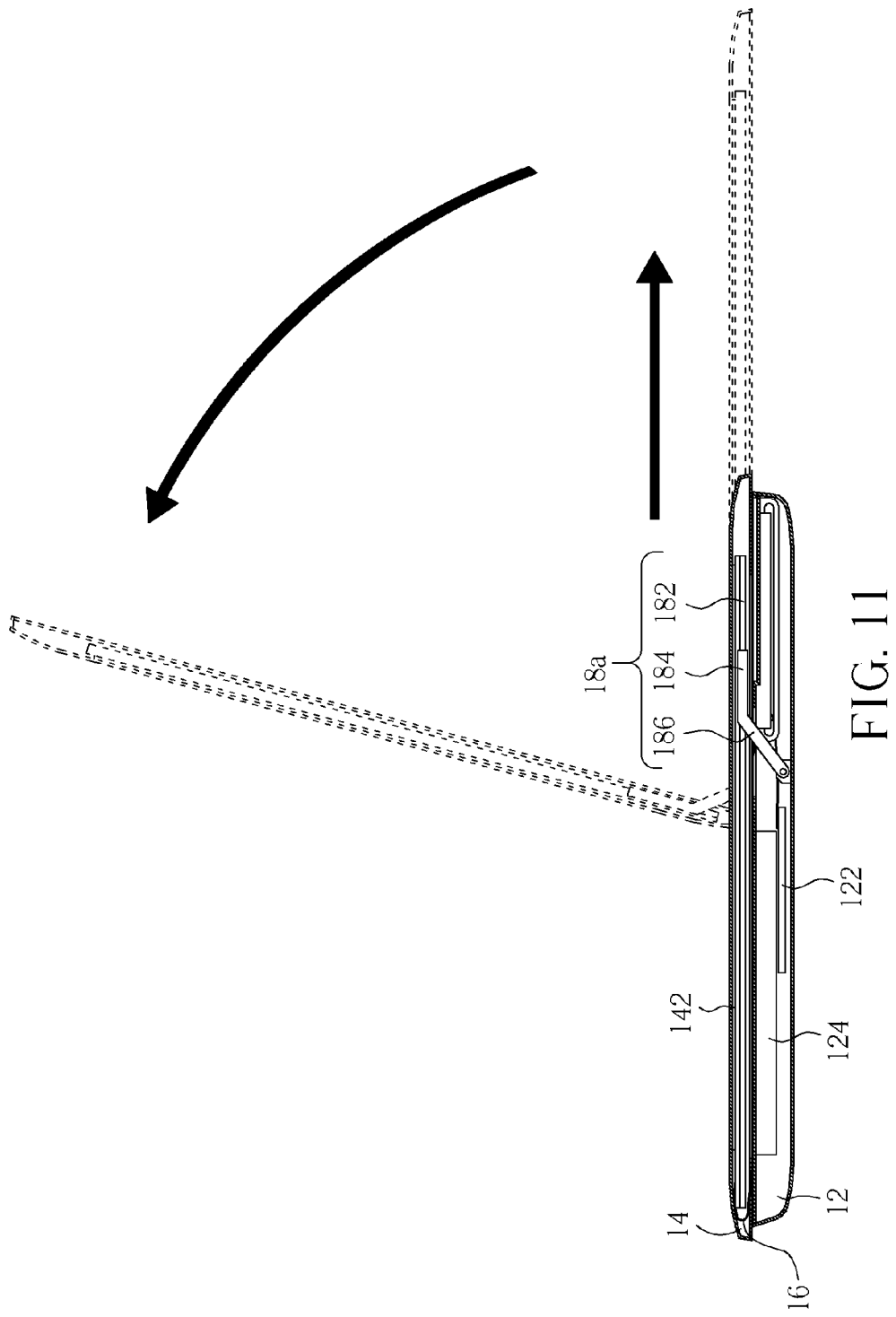
FIG. 11 is a sectional side view illustrating the engagement mechanism of the first casing and the second casing of the slider electronic apparatus in FIG. 1.

It is added that in the above embodiments, the hinge 18a has the function of sliding and rotating. Please refer to FIG. 11, which is a sectional side view illustrating the engagement mechanism of the first casing 12 and the second casing 14. The hinge 18a includes a fixed slide 182, a sliding part 184, and a connection part 186. The fixed slide 182 is fixed on the second casing 14, e.g. directly to the frame of the display module 142 in practice. The sliding part 184 is movably disposed on the fixed slide 182. The connection part 186 connects the sliding part 184 and the first casing 12 such that the sliding part 184 is capable of rotating relative to the first casing 12. In practice, the connection part 186 can be pivotally connected only to the sliding part 184 or the first casing 12, or both. Thereby, when the slider electronic apparatus 1 changes from the tablet operation mode (such as in FIG. 4) to the keyboard input mode (such as in FIG. 3), the user can move the second casing 14 backward and rotate the second casing 14, indicated by the dashed lines and arrows in FIG. 11; however, the invention is not limited thereto. Any other connection mechanism capable of providing sliding and rotating movement is applicable to the pivotal connection mechanism of the invention. Furthermore, in the embodiment, the hinge 18b is identical to the hinge 18a and will not be repeated herein, but the invention is not limited thereto. In addition, the above two forcing mechanisms are illustrated in the way of keeping the pushing-against part be pushed backward; however, a person having ordinary skill in the art can understand easily that changing the disposition of the forcing mechanism at the rear of the pushing-against part to continuously pull the pushing-against part also can keep the flat cable in the stretch state during relatively moving of the casings of the slider electronic apparatus, which will not be described herein.

As discussed above, the flat cable arranging structure and the slider electronic apparatus having the flat cable arranging structure of the invention use a cable dynamically-arranging design, which uses the forcing mechanism to apply force to the pushing-against part continuously such that the pushing-against part can be kept in pushing the flat cable. Therefore, the flat cable can always be kept in the stretch state. During relatively moving of the casings of the slider electronic apparatus, the flat cable can be held stably without damage by intertwining the flat cable, which solves the problem in the prior art that the stretch mechanism for the flat cable in the common slider tablet computer by use of the structural stability of the flat cable may easily induce the intertwining of the flat cable leading to damage after long-term use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat cable arranging structure disposed in a slider electronic apparatus, the slider electronic apparatus comprising a first casing, a second casing, and a flat cable, the first casing and the second casing being movably connected to each other, the first casing having an opening, the flat cable passing through the opening and being connected to the first casing and the second casing respectively, the flat cable arranging structure comprising:
    a movement-guiding structure disposed in the first casing;
    a pushing-against part connected to the movement-guiding structure and capable of being confined by the movement-guiding structure to slide in a specific direction, a portion of the flat cable winding the pushing-against part; and
    a forcing mechanism disposed in the first casing and at least contacting the pushing-against part for applying force to the pushing-against part to keep the flat cable in a tensile stretch state.

2. The flat cable arranging structure of claim 1, wherein the movement-guiding structure comprises two guiding slots fixedly disposed in parallel in the first casing, and the pushing-against part is movably disposed in the guiding slots.

3. The flat cable arranging structure of claim 2, wherein the guiding slots are disposed at two opposite sides of the opening.

4. The flat cable arranging structure of claim 2, wherein the movement-guiding structure comprises a constraint sidewall parallel to the guiding slots and fixedly disposed in the first casing to constrain the pushing-against part to move in the specific direction.

5. The flat cable arranging structure of claim 1, wherein the movement-guiding structure comprises a first guiding slide fixedly disposed in the first casing, and the pushing-against part is movably disposed on the first guiding slide.

6. The flat cable arranging structure of claim 5, wherein the movement-guiding structure comprises a second guiding slide parallel to the first guiding slide and fixedly disposed in the first casing, and the pushing-against part is movably disposed on the first guiding slide and the second guiding slide.

7. The flat cable arranging structure of claim 1, wherein the pushing-against part is a rod having a curved surface, and the pushing-against part pushes the flat cable by the curved surface.

8. The flat cable arranging structure of claim 1, wherein the forcing mechanism comprises a torsion spring having a fixed end and a free end, the fixed end is fixed in the first casing, and the free end pushes the pushing-against part.

9. The flat cable arranging structure of claim 8, wherein the free end forms a bracket holding the pushing-against part.

10. The flat cable arranging structure of claim 1, wherein the forcing mechanism comprises a transmission lever and a spring, the transmission lever has a pivot, a long arm portion, and a short arm portion, an end of the spring is fixed in the first casing, another end of the spring is connected to the short arm portion, the transmission lever is capable of rotating about the pivot, and the long arm portion pushes the pushing-against part.

11. A slider electronic apparatus, comprising:
    a first casing having an opening;
    a second casing movably connected to the first casing;
    a flat cable passing through the opening and connected to the first casing and the second casing respectively; and
    a flat cable arranging structure, comprising:
        a movement-guiding structure disposed in the first casing;
        a pushing-against part connected to the movement-guiding structure and capable of being confined by the movement-guiding structure to slide in a specific direction, a portion of the flat cable winding the pushing-against part; and
        a forcing mechanism disposed in the first casing and at least contacting the pushing-against part for applying force to the pushing-against part to keep the flat cable in a tensile stretch state.

12. The slider electronic apparatus of claim 11, wherein the movement-guiding structure comprises two guiding slots fixedly disposed in parallel in the first casing, and the pushing-against part is movably disposed in the guiding slots.

13. The slider electronic apparatus of claim 12, wherein the guiding slots are disposed at two opposite sides of the opening.

14. The slider electronic apparatus of claim 12, wherein the movement-guiding structure comprises a constraint sidewall parallel to the guiding slots and fixedly disposed in the first casing to constrain the pushing-against part to move in the specific direction.

15. The slider electronic apparatus of claim 11, wherein the movement-guiding structure comprises a first guiding slide fixedly disposed in the first casing, and the pushing-against part is movably disposed on the first guiding slide.

16. The slider electronic apparatus of claim 15, wherein the movement-guiding structure comprises a second guiding slide parallel to the first guiding slide and fixedly disposed in the first casing, and the pushing-against part is movably disposed on the first guiding slide and the second guiding slide.

17. The slider electronic apparatus of claim 11, wherein the pushing-against part is a rod having a curved surface, and the pushing-against part pushes the flat cable by the curved surface.

18. The slider electronic apparatus of claim 11, wherein the forcing mechanism comprises a torsion spring having a fixed end and a free end, the fixed end is fixed in the first casing, and the free end pushes the pushing-against part.

19. The slider electronic apparatus of claim 18, wherein the free end forms a bracket holding the pushing-against part.

20. The slider electronic apparatus of claim 11, wherein the forcing mechanism comprises a transmission lever and a spring, the transmission lever has a pivot, a long arm portion, and a short arm portion, an end of the spring is fixed in the first casing, another end of the spring is connected to the short arm portion, the transmission lever is capable of rotating about the pivot, and the long arm portion pushes the pushing-against part.

21. The slider electronic apparatus of claim 11, further comprising a pivotal connection mechanism, the first casing and the second casing being connected by the pivotal connection mechanism, the first casing being capable of moving and rotating relative to the second casing by the pivotal connection mechanism.

22. The slider electronic apparatus of claim 11, wherein a processing module is disposed in the first casing, a display module is disposed in the second casing, and the flat cable is electrically connected to the display module and the processing module respectively.

* * * * *